Oct. 31, 1933.  C. M. WILCOX  1,932,498
VARIABLE CONDENSER AND APPARATUS FOR OPERATING AND SUPPORTING THE SAME
Filed Nov. 23, 1931   3 Sheets-Sheet 1
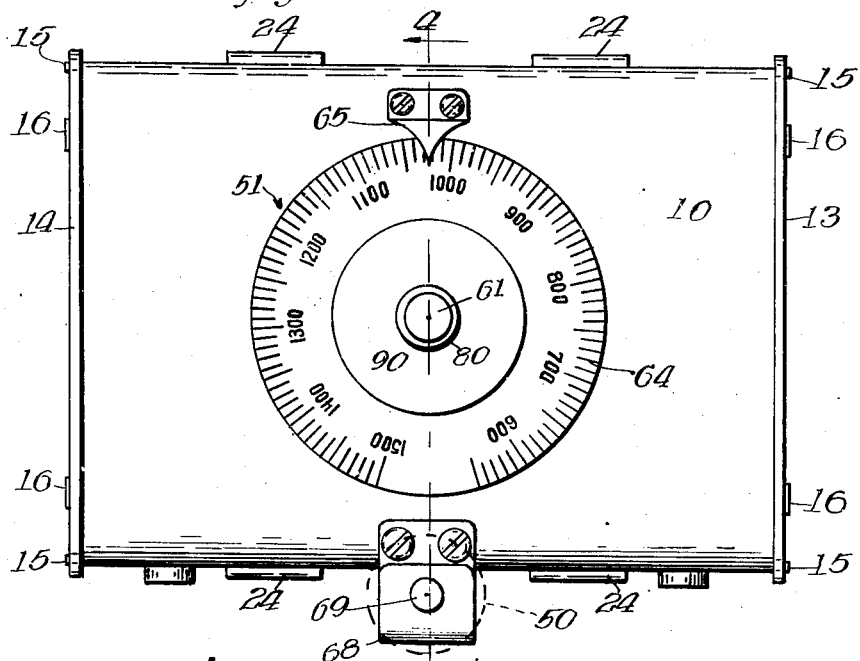
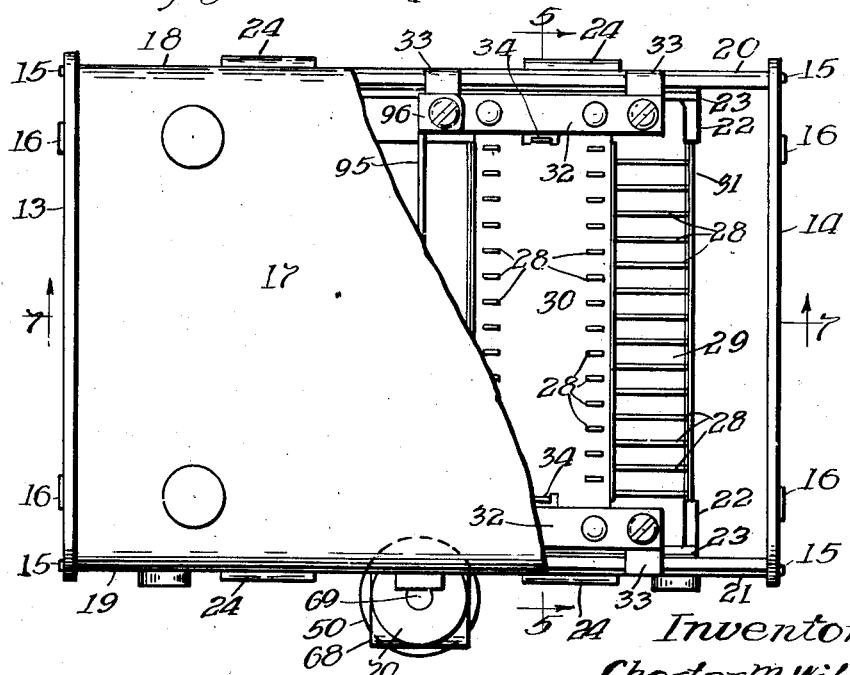
Inventor:
Chester M. Wilcox
By Arthur F. Sprinkle
Atty.

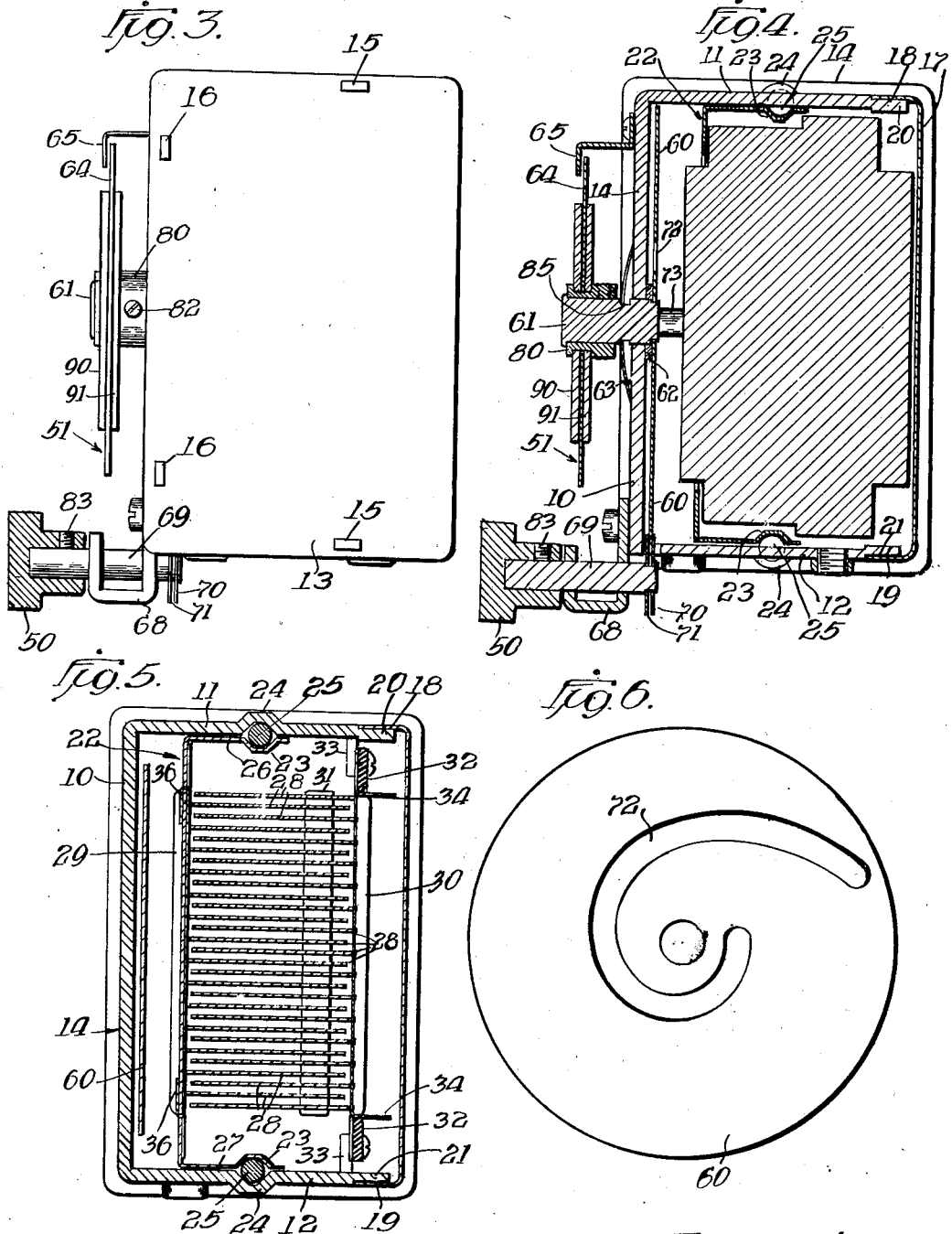

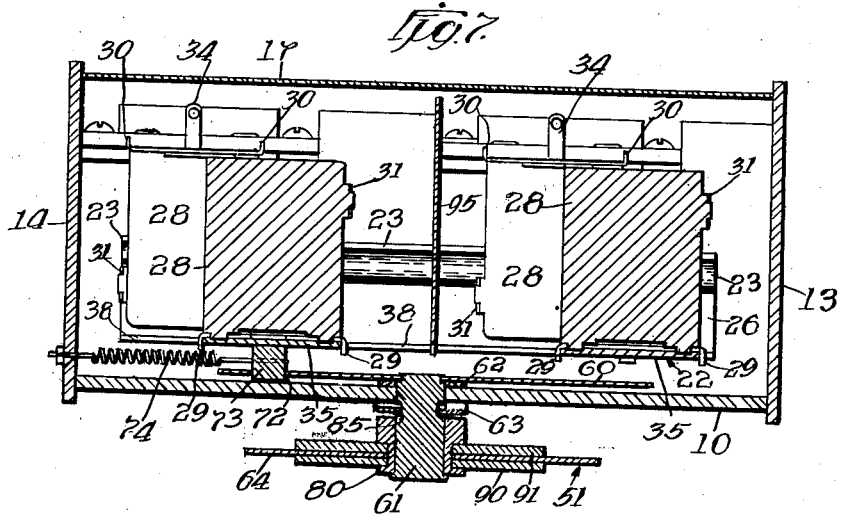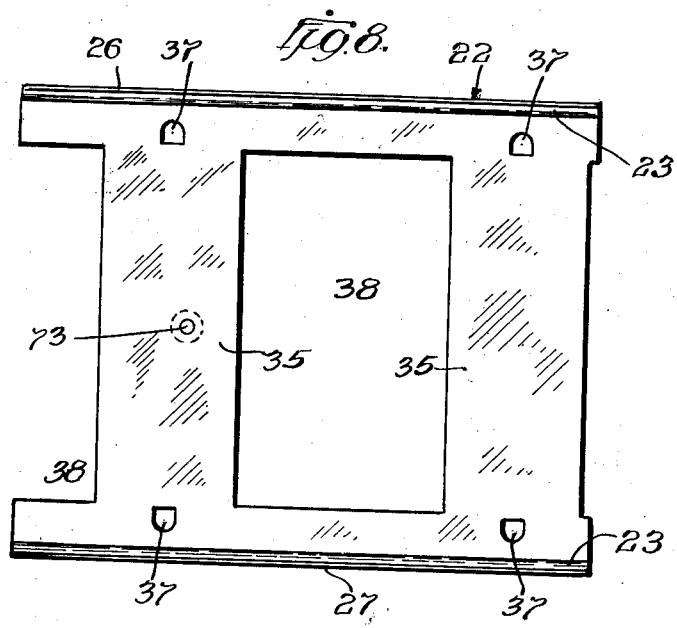

Patented Oct. 31, 1933

1,932,498

UNITED STATES PATENT OFFICE 1,932,498

VARIABLE CONDENSER AND APPARATUS FOR OPERATING AND SUPPORTING THE SAME

Chester M. Wilcox, Charlotte, Mich., assignor to General Apparatus Corporation, New York, N. Y., a corporation of New York Application November 23, 1931
Serial No. 576,633

10 Claims. (Cl. 175—41.5)

My invention relates to variable electrical condensers adapted particularly for use in radio receiving sets and pertains more particularly to condensers of the sliding type, and to improved means for supporting and operating the same.

One of the chief objects of my invention is to provide a variable condenser structure of the sliding type with the necessary supporting and operating elements in which the moving elements of the device operate with a minimum of friction.

Another object of my invention is to provide a variable condenser structure of the sliding type in which the movable plates thereof may be easily aligned to accurately interleave with the stationary or stator plates and to maintain this alignment during long periods of use.

Another object of my invention is to provide an improved condenser structure with a simple driving mechanism for transforming rotary movement of an operating control shaft into linear movement of the condenser plates, said mechanism being capable of providing a continuously variable ratio between the movement of the operating control shaft and the slidable movements of the shiftable condenser plates, the rate of change of this ratio being controllable between wide limits at all points in the adjustment of the stationary plates.

Another object of my invention is to provide a variable condenser of compact construction and small size and having at the same time comparatively low minimum and high maximum values of capacity so that such condenser will not sacrifice the desirable features of larger condensers.

Another object of my invention is to provide for a variable condenser of the sliding type an inexpensive but relatively efficient and very rigid frame construction.

Another object of my invention is to provide a variable condenser of the sliding type with efficient and economical design of frame so constructed as to enclose the conducting elements of the condenser, thus shielding them from electro-magnetic and electro-static coupling, such frame also furnishing rigid and convenient supports for the insulating members which in turn hold the assembly of the stator plates.

Another object of my invention is to provide a method of economically assembling moving and stationary plates in a form of construction which rigidly supports said plates in accurately spaced alignment.

Another object of my invention is to provide an inexpensive and practical design of variable condenser utilizing rectangular plates of small dimensions thereby minimizing the effect of irregularities or defects in plate mountings and lack of flatness in the material of which the plates are made.

The above and other objects will be apparent from the following description of the preferred form of the invention, reference being had to the accompanying drawings forming a part of the specification, the novel features being set forth in the appended claims.

In the said drawings:

Fig. 1 is a front elevational view of the complete condenser.

Fig. 2 is a rear view of the same with a portion of the rear cover plate of the casing broken away to disclose details of construction of condenser apparatus on the interior.

Fig. 3 is an end elevation view of the condenser.

Fig. 4 is a cross section taken through the condenser on line 4—4 of Fig. 1, looking in the direction indicated by the arrows and showing parts of the driving mechanism in relationship to the supporting frame, also the detachable casing cover and a condenser unit magnetic shield shown in section in plate form and located between the two units.

Fig. 5 is a cross section taken on line 5—5 of Fig. 2 looking in the direction indicated by the arrows.

Fig. 6 is a detached plan view of the drive disk.

Fig. 7 is a longitudinal section taken on line 7—7 of Fig. 2 looking in the direction indicated by the arrows.

Fig. 8 is a detached plan view of the channel shaped condenser plate carriage, shown also in section in Figs. 4, 5 and 7.

Like numerals refer to like parts throughout the several views.

The frame consists of the two end plates 13, 14 into which the channel shaped member comprising the front plate 10 and the integrally formed top and bottom plates 11, 12, by means of the integral tongues 15, 16, is mortised and swaged thus forming a box type frame construction. A detachable back cover 17 is provided having top and bottom flanges 18, 19 which telescopes over the slightly recessed outer edges 20, 21 of the frame thereby completing the enclosure of the mechanism. This frame construction may be made of pressed sheet steel; it is inexpensive and adaptable to quantity production; being of channel form is hence very rigid; it forms an electro-magnetic and electrostatic shield for the conducting portions, and it protects the mechanism from mechanical damage and dirt; whereas frames for sliding type condensers have in the past been of different construction usually consisting of an assembly of plates or bars which in all cases lacked one or more of the features obtained by my construction.

A channel shaped carriage member 22 (Fig. 8) adapted to support one or more moving condenser plate assemblies is located within the frame. Opposed, parallel runways 23 extending the length of the carriage are pressed into its top and bottom turned edges 26, 27. Corresponding, comparatively short runways 24 are pressed into the top and bottom portions 11, 12 of the frame, these being only of sufficient length (one half the movement of the carriage plus the diameter of the ball) to permit the desired movement of the sliding carriage member 22, and are located as near the ends of the condenser frame as practical without permitting the escape of the balls 25 (Fig. 5). These balls operate in the runways between the frame and the moving carriage as indicated. The carriage 22 is of elastic or spring material and the top and bottom grooved portions 26, 27 press outwardly against the balls. The balls operating in the runways support the sliding carriage accurately in place within the frame and limit its movement to a substantially straight line. This construction reduces friction between the sliding carriage and the frame to a minimum and it provides a method of holding the sliding carriage in alignment that is entirely without play. Wear upon bearing points is taken up by the spring in the flexible sides of the carriage and since the bearing points are opposed no change in alignment will occur from the effect of the wear at the bearing points. This method of supporting the sliding carriage is inexpensive, easily assembled and requires no adjustment, whereas previously used constructions have usually utilized a plate sliding between bars in a groove or some equivalent, and have had few if any of the advantages mentioned.

Ball bearings are shown as the rolling members but it is understood that equivalents such as rollers either fixed or stationary are also covered by my invention.

The moving and stationary plates 28 used in this condenser are alike and may be duplicates, are individually small in area, and are held in spaced alignment for strengthening purposes by channel shaped mounting plates 29, 30 into which they are mortised and swaged. They are held in accurately spaced alignment at an additional point on their outer peripheries by the spacing ties 31 into which they are also mortised and swaged. In the case of the stationary plates there is attached to each end of the mounting plate 30 an insulating member 32 which is in turn supported by brackets 33 formed from the sides 11, 12 of the frame. These brackets being integral with the frame member are rigid, accurate, inexpensive, and form an improved method of supporting the stationary plate assembly.

From the material of which the mounting plate 30 is made, are formed soldering lugs 34 thus forming a direct contact to the mounting plate at a point convenient for attaching circuit wires by soldering and also saving the cost of a separate soldering lug.

In the mounting of the moving plate assemblies on the sliding carriage 22 the side flanges of the channel shaped mounting plates 29 fit accurately on each side of the integrally formed cross members 35 contained in the bottom of the sliding carriage. Lugs 36, formed from the material of the mounting plate 29, extend through openings 37 in the bottom plate of the carriage 22 and when clinched hold the assembly in place thereon. These constructions are improved methods of accurately aligning and holding moving plate assemblies to the carriage.

Rectangular openings 38 are cut in the sliding carriage 22 corresponding with the positions of the stator plates when the moving plates 28 are entirely withdrawn from their closed and overlapping relation to the similar stator plates thereby increasing the distance between the stator plates and any conductor at moving plate potential, thus decreasing the minimum capacity at that minimum position.

The relative positions, as well as the shape and the direction of movement of the plates described in this condenser will produce a linear capacity change in direct proportion to the movement of the plates. Such a condition makes easy matching of synchronously operated condenser units. In practical use, particularly for use in radio sets, it is desirable to have the rate of change of capacity in respect to control knob 50 and dial movement as indicated by dial 51, a variable factor, thus making the movement of the control knob proportional either to the frequency or wavelength as may be desired of the electrical circuit with which the condenser is designed to be associated. Plates have been made of shapes to produce this desired result or an approximation thereof but at the cost of waste space and lack of rigidity. My invention provides a method of securing at all points of the condenser adjustment a proper and predetermined rate of change of capacity in respect to dial movement. This will be seen by reference to the drawings, Figs. 5, 6 and 7 in which disc 60 is mounted in a rotatable position on the condenser frame 10 by means of shaft 61 to which it is fixed at the inner shouldered and upset portion of the shaft, and is held in spaced relationship from the frame by washer 62 which being of suitable absorbent material as of felt, carries a lubricant for the bearing, and is held in position by a curved tension spring 63. Attached to shaft 61 by sleeve 80 is a scale disc 64 held between plates 90, 91 arranged by suitable markings thereon to indicate in connection with point 65 the relative movement of the disc 64. Attached to frame 10 is a bracket 68 which forms a supporting bearing for shaft 69 which, at its inner end is provided with the slightly separated spring friction plates 70, 71 adapted to engage the periphery of the disc 60. The shaft 69 may have a handle or knob 50 for turning the shaft to operate the disc in adjusting the condenser carriage. Other means of driving this disc may however be employed.

A spiral slot 72 is cut in disc 60 and the contour of this slot or cam 72 will depend upon the rate of change of capacity desired at the various points of condenser movement. Operating in engagement with slot 72 is pin 73 which is fixedly attached to one of the integral bars 35 of condenser carriage 22 thus serving as a coupling medium between the straight line movement of the carriage 22 and the rotating disc 60. The pin may be fitted to the slot so as to prevent objectionable play but if desired a spring 74 (Fig. 7) may be utilized to hold the pin in contact with one side of the slot.

The utilization of the large sized disc 60 with the cam drive provided by the irregular cam slot 72 provides a ready means by which the relative movement and rate of change of the plates may be varied or regulated according to any desired variable rate to be predetermined in the layout of the cam slot 72, the approximate shape of which should be very near to that shown in Fig. 6 to secure excellent results when the condenser apparatus is utilized in the ordinary manner in association with radio receiving apparatus.

Many variations of the particular construction described for radio and other analogous purposes within the ordinary skill of those skilled in the art are possible and I desire that it be understood that modifications may be made and that I intend no limitations on my invention other than those imposed by the scope of the appended claims.

I claim:

1. A variable condenser construction comprising in combination a pair of end plates, a channel shaped body member connecting said end plates forming a box type frame and being adapted to support stator condenser plates, a moving member of channel form adapted to support movable condenser plates mounted within said frame and supported by said frame in a manner permitting only substantially straight line movement thereof in relation to said frame.

2. In a variable condenser of the sliding plate type, the combination with a channel shaped body member, of a pair of end plates secured thereto for forming a box type frame, means on the channel shaped member for securing thereto a plurality of stator plates arranged in spaced relationship with each other, a channel shaped moving member formed of resilient sheet metal, anti-friction devices interposed between said channel shaped moving member and the channel shaped body member of the frame, and a plurality of spaced apart condenser plates carried by the moving member and interleaving with the said stator plates on the frame body member.

3. In a variable condenser the combination with a channel shaped body member provided with a pair of end closure plates forming a box type frame, a plurality of projections formed integrally on said channel shaped member, a plurality of insulating members attached to said integral projections, a mounting plate attached to said insulating members, a plurality of spaced apart stator plates supported by said mounting plates, a moving member mounted within said frame, comprising a channel shaped body formed of resilient sheet metal, there being grooves formed thereon for co-operating with grooves formed in the walls of the channel shaped body member, anti-friction devices within said grooves, and a plurality of movable condenser plates secured upon the movable member and interleaved with the said stator plates on the said body member.

4. In a variable condenser the combination with a supporting frame in the form of a box-like structure, a carriage element mounted for longitudinal movement within the frame and consisting of a channel formed of resilient sheet metal, there being longitudinal grooves in the legs of the channel adapted to co-operate with anti-friction devices to permit movement of the carriage element in relation to the frame, the bottom of the channel member being cut away at intervals to form cross members between the sides of the carriage, a condenser leaf mounting plate of channel form adapted to receive within the said channel portion thereof, the cross members formed in the carriage element, there being a plurality of openings in said carriage element, a plurality of lugs pressed from the material of said mounting plate in alignment with the openings in said carriage element thereby providing means for holding said mounting plate to said carriage, and a plurality of conducting plates fixedly attached in spaced relationship with each other to said channel shaped mounting plate.

5. In a variable condenser the combination with a frame, a moving element comprising a carriage of channel-like shape formed from sheet metal, a mounting plate, a plurality of conducting plates secured in spaced relationship to said mounting plate, a plurality of lugs formed from the material of said mounting plate, there being a plurality of openings in the said carriage member for receiving said lugs of the mounting plate whereby to hold said mounting plate and said conducting plates carried thereby in alignment with said carriage member.

6. In a variable condenser of the type having elements variably inter-leaved by substantially relative straight line movements, the combination of a frame, a plurality of insulating members attached to said frame, a plurality of stationary conducting plates held in spaced relationship with respect to each other and being secured by said insulating members to said frame, a plurality of moving conductor plates held in spaced relationship to each other, a movable carriage supporting said movable plates and mounted for sliding movements on the frame, to provide substantial straight line movements for interleaving said moving plates with said stationary plates, the moving carriage being in substantially channel form of sheet metal and being provided with an opening adapted to underlie said stationary condenser plates when the moving carriage is operated to separate the movable plates from the stationary plates for the purpose of decreasing the electrical capacity between the said stationary plates and said carriage member.

7. A variable gang condenser comprising, in combination, a hollow, box-like frame, having oppositely disposed, relatively rigid faces, ball races carried by said faces, a carriage mounted within said frame and having oppositely disposed, resilient faces, ball races carried by said resilient faces, said frame, carriage and races being formed to provide for movement of said carriage parallel to itself within said frame, and anti-friction bearings interposed in said races, a plurality of groups of stator plates secured to said frame, and a plurality of groups of moving plates secured to said carriage and forming a plurality of variable condensers, the relation of said plate groups being so chosen that movement of said carriage varies the capacity of said condensers simultaneously and similarly.

8. A variable gang condenser comprising, in combination, a hollow, box-like frame, having oppositely disposed, relatively rigid faces, ball races carried by said faces from the inner sides thereof, and extending transversely of said frame, a carriage mounted within said frame and comprising a channel member having oppositely disposed resilient faces, ball races carried on the outside of said faces, said carriage being arranged to fit within said frame, and said races being arranged to permit longitudinal movement only of said carriage within said frame, anti-friction bearings positioned in said races, a plurality of groups of stator plates secured to said frame, and a plurality of groups of movable plates secured to said carriage, said groups defining a plurality of variable condensers, and the stator and moving plate groups being so positioned with reference to each other that movement of said carriage varies each of said condensers simultaneously and similarly.

9. A variable gang condenser comprising, in combination, a hollow, box-like frame, having oppositely disposed, relatively rigid faces, ball races carried by said faces and extending longitudinally therefrom, a carriage mounted within said frame and having faces extending from opposite sides thereof, and cooperating with said rigid faces, ball races positioned on said resilient faces and extending longitudinally thereof to cooperate with the ball races on said fixed faces, anti-friction bearings positioned in said races, a plurality of groups of stator plates mounted within said frame parallel to said rigid faces, a plurality of groups of moving plates mounted in said carriage in intermeshing relation with said fixed plates, each of said group of plates constituting a variable condenser, and means for moving said carriage in said frame whereby said condensers are varied simultaneously and similarly.

10. A variable condenser comprising, in combination, a box-like frame, comprising a U-shaped member and end plates secured thereto, a carriage nesting within said frame, comprising a second U-shaped member, anti-friction bearings positioned between the outwardly extending arms of said U-shaped members, stator plates mounted within said frame and extending longitudinally thereof, moving plates mounted in said carriage and extending longitudinally thereof for intermeshing engagement with said stator plates, and means extending through said frame for causing longitudinal movement of said carriage within said frame.

CHESTER M. WILCOX.